(12) United States Patent
Jayaraman et al.

(10) Patent No.: US 12,386,534 B2
(45) Date of Patent: Aug. 12, 2025

(54) AVOIDING GARBAGE COLLECTION IN MEDIA STORAGE DEVICES

(71) Applicant: Western Digital Technologies, Inc., San Jose, CA (US)

(72) Inventors: Muralitharan Jayaraman, San Jose, CA (US); Rampraveen Somasundaram, San Jose, CA (US); Sundar Panneer Selvam, San Jose, CA (US); Durga Praveen Maddineni, San Jose, CA (US); Daniel J. Linnen, Naperville, IL (US)

(73) Assignee: Sandisk Technologies, Inc., Milpitas, CA (US)

( * ) Notice: Subject to any disclaimer, the term of this patent is extended or adjusted under 35 U.S.C. 154(b) by 87 days.

(21) Appl. No.: 18/359,765

(22) Filed: Jul. 26, 2023

(65) Prior Publication Data

US 2024/0354017 A1 Oct. 24, 2024

Related U.S. Application Data

(60) Provisional application No. 63/496,895, filed on Apr. 18, 2023.

(51) Int. Cl.
*G06F 3/06* (2006.01)

(52) U.S. Cl.
CPC ............ *G06F 3/064* (2013.01); *G06F 3/0611* (2013.01); *G06F 3/0659* (2013.01); *G06F 3/0679* (2013.01); *G06F 2212/7204* (2013.01)

(58) Field of Classification Search
CPC .......... G06F 3/064; G06F 3/061; G06F 3/065; G06F 3/0679; G06F 2212/7204
See application file for complete search history.

(56) References Cited

U.S. PATENT DOCUMENTS

| | | | |
|---|---|---|---|
| 2006/0026211 A1* | 2/2006 | Potteiger | G06F 3/0616 711/E12.04 |
| 2020/0042243 A1* | 2/2020 | Lee | G06F 3/064 |
| 2021/0209019 A1* | 7/2021 | Aviles, Jr. | G06F 1/263 |
| 2023/0014508 A1* | 1/2023 | Kanno | G11C 16/10 |

* cited by examiner

*Primary Examiner* — Kalpit Parikh
(74) *Attorney, Agent, or Firm* — PATTERSON + SHERIDAN, LLP

(57) ABSTRACT

Rather than storing multiple video files in a jumbo block (JB), the video file is stored in one or more complete JBs while the remaining data of the video file that does not fill a complete JB is stored in a tail block (TB). Generally, data sets are not mixed within a JB, but rather, the extra, excess, or tail data is stored in the TB. Multiple video file extra, excess, or tail data can be stored in a common TB. Stated another way, a TB is able to hold multiple video file tails from multiple video files. The use of the TB decreases garbage collection (GC) of jumbo blocks.

19 Claims, 9 Drawing Sheets

US 12,386,534 B2

AVOIDING GARBAGE COLLECTION IN MEDIA STORAGE DEVICES

CROSS-REFERENCE TO RELATED APPLICATIONS

This application claims benefit of U.S. Provisional Patent Application Ser. No. 63/496,895, filed Apr. 18, 2023, which is herein incorporated by reference.

BACKGROUND OF THE DISCLOSURE

Field of the Disclosure

Embodiments of the present disclosure generally relates to sending tail data to a separate jumbo block (JB) to limit garbage collection (GC).

Description of the Related Art

In storage devices that support guaranteed write and read performances, a host divides the total user capacity into equal sized units called Allocation Units (AUs) or cluster size. As used herein, the term AU will be used interchangeably for AU or cluster size. AU size may not align with physical NAND block size, and host data is written across word lines (WL) at the same offset across all planes and across all dies in the flash memory, combined to form JBs. A single video recording file may be of a single or multiple AU size. To support multi-stream recording, sequential streams (i.e., a JB) may be opened. A few hosts may not follow the writing into AUs after AUs are read and shall have a media file within one jumbo block (JB) or across multiple JBs. If a media file is spread across JBs or multiple files are present in a JB, deletion of file(s) may cause garbage collection (GC) activity.

As the JB's store these media files, some media files may be too large to store on a single jumbo block. Video files that cannot fit on one JB are split. The split of the video files are between a first JB and however many JB's are needed to store the remaining video files. With the split, the need for extra GC is increased due to multiple JBs having to be read when analyzing the stored video files in the multiple JBs.

Therefore, there is a need in the art for separating JBs to limit GC.

SUMMARY OF THE DISCLOSURE

Rather than storing multiple video files in a jumbo block (JB), the video file is stored in one or more complete JBs while the remaining data of the video file that does not fill a complete JB in stored in a tail block (TB). Generally, data sets are not mixed within a JB, but rather, the extra, excess, or tail data is stored in the TB. Multiple video file extra, excess, or tail data can be stored in a common TB. Stated another way, a TB is able to hold a plurality of video file tails from multiple video files. The use of the TB decreases garbage collection (GC) of jumbo blocks.

In one embodiment, a data storage device comprises: a memory device; and a controller coupled to the memory device, wherein the controller is configured to: receive a first command to write first data to the memory device; determine that the first data will comprise: a first portion that will span an entirety of one or more first jumbo blocks of the memory device; and a second portion that will span less than an entirety of a jumbo block of the memory device; write the first portion to the one or more first jumbo blocks; allocate a first tail block storage location from a tail block pool of the memory device; and write the second portion to the tail block storage location.

In another embodiment, a data storage device comprises: a first memory device; a second memory device; and a controller coupled to the first memory device and the second memory device, wherein the controller is configured to: receive a command to write first data to the first memory device; determine that the first data will comprise: a first portion that will span an entirety of one or more first data tracks of the first memory device; and a second portion that will span less than an entirety of a data track of the first memory device; write the first portion to the one or more first data tracks of the first memory device; and write the second portion to the second memory device.

In another embodiment, a data storage device comprises: means to store data; and a controller coupled to the means to store data, wherein the controller is configured to: receive a command to write data to the means to store data; determine that the data will comprise: a first portion that will span an entirety of one or more jumbo blocks of the means to store memory; and a second portion that will span less than an entirety of a jumbo block of the means to store memory; write the second portion to single level cell (SLC) memory of the one or more jumbo blocks; and write the first portion to multi-level cell (MLC) memory of the one or more jumbo blocks.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Rather than storing multiple video files in a jumbo block (JB), the video file is stored in one or more complete JBs while the remaining data of the video file that does not fill a complete JB in stored in a tail block (TB). Generally, data sets are not mixed within a JB, but rather, the extra, excess, or tail data is stored in the TB. Multiple video file extra, excess, or tail data can be stored in a common TB. Stated another way, a TB is able to hold a plurality of video file tails from multiple video files. The use of the TB decreases garbage collection (GC) of jumbo blocks.

Figure 1:
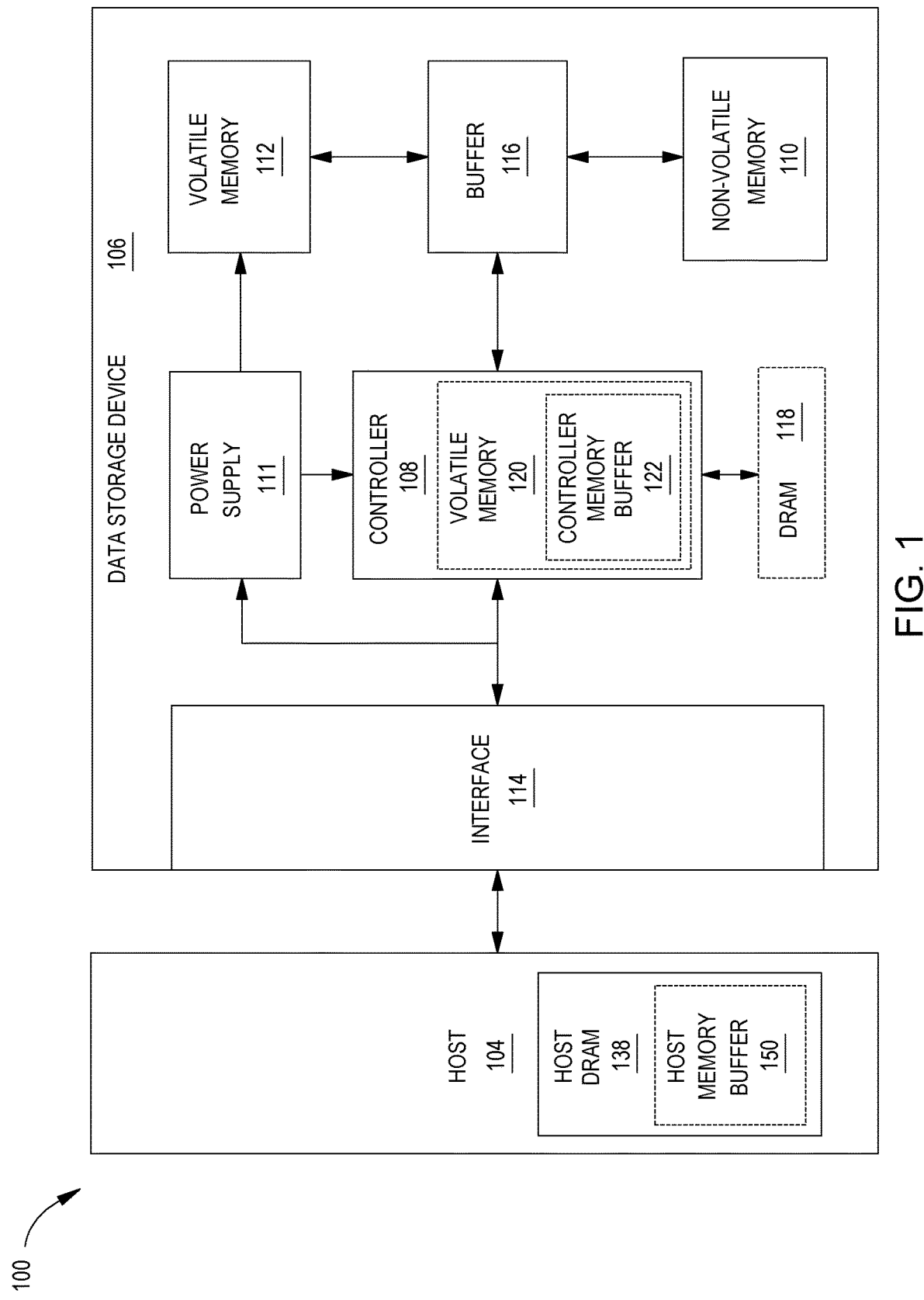
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
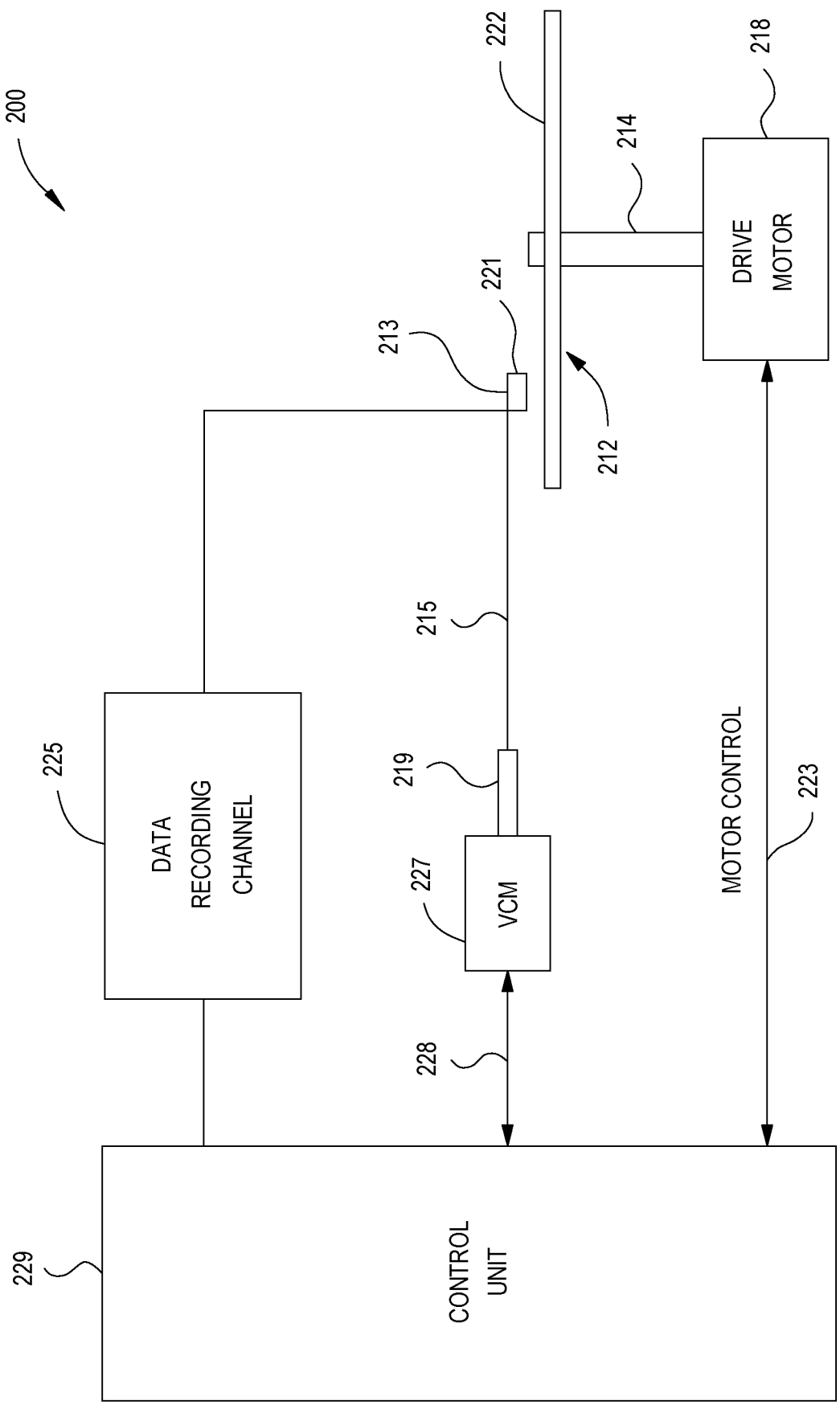
FIG. 2 is a schematic illustration of a magnetic recording device, according to certain embodiments.

FIG. 2 is a schematic illustration of a magnetic recording device 200, according to certain embodiments. The magnetic recording device 200 includes a magnetic recording head, such as a write head. The magnetic recording device 200 is a magnetic media drive, such as a hard disk drive (HDD). Such magnetic media drives may be a single drive/device or include multiple drives/devices. For the ease of illustration, a single disk drive is shown as the magnetic recording device 200 in the implementation illustrated in FIG. 2. The magnet recording device 200 (e.g., a disk drive) includes at least one rotatable magnetic disk 212 supported on a spindle 214 and rotated by a drive motor 218. The magnetic recording on each rotatable magnetic disk 212 is in the form of any suitable patterns of data tracks, such as annular patterns of concentric data tracks on the rotatable magnetic disk 212.

At least one slider 213 is positioned near the rotatable magnetic disk 212. Each slider 213 supports a head assembly 221. The head assembly 221 includes one or more magnetic recording heads (such as read/write heads), such as a write head including a spintronic device. As the rotatable magnetic disk 212 rotates, the slider 213 moves radially in and out over the disk surface 222 so that the head assembly 221 may access different tracks of the rotatable magnetic disk 212 where desired data are written. Each slider 213 is attached to an actuator arm 219 by way of a suspension 215. The suspension 215 provides a slight spring force which biases the slider 213 toward the disk surface 222. Each actuator arm 219 is attached to an actuator 227. The actuator 227 as shown in FIG. 2 may be a voice coil motor (VCM). The VCM includes a coil movable within a fixed magnetic field, the direction and speed of the coil movements being controlled by the motor current signals supplied by a control unit 229.

The head assembly 221, such as a write head of the head assembly 221, includes a media facing surface (MFS) such as an air bearing surface (ABS) that faces the disk surface 222. During operation of the magnetic recording device 200, the rotation of the rotatable magnetic disk 212 generates an air or gas bearing between the slider 213 and the disk surface 222 which exerts an upward force or lift on the slider 213. The air or gas bearing thus counter-balances the slight spring force of suspension 215 and supports the slider 213 off and slightly above the disk surface 222 by a small, substantially constant spacing during operation.

The various components of the magnetic recording device 200 are controlled in operation by control signals generated by control unit 229, such as access control signals and internal clock signals. The control unit 229 includes logic control circuits, storage means and a microprocessor. The control unit 229 generates control signals to control various system operations such as drive motor control signals on a line 223 and head position and seek control signals on a line 228. The control signals on line 228 provide the desired current profiles to optimally move and position slider 213 to the desired data track on rotatable magnetic disk 212. Write and read signals are communicated to and from the head assembly 221 by way of recording channel 225. In one embodiment, which can be combined with other embodiments, the magnetic recording device 200 may further include a plurality of media, or disks, a plurality of actuators, and/or a plurality number of sliders.

Figure 3:
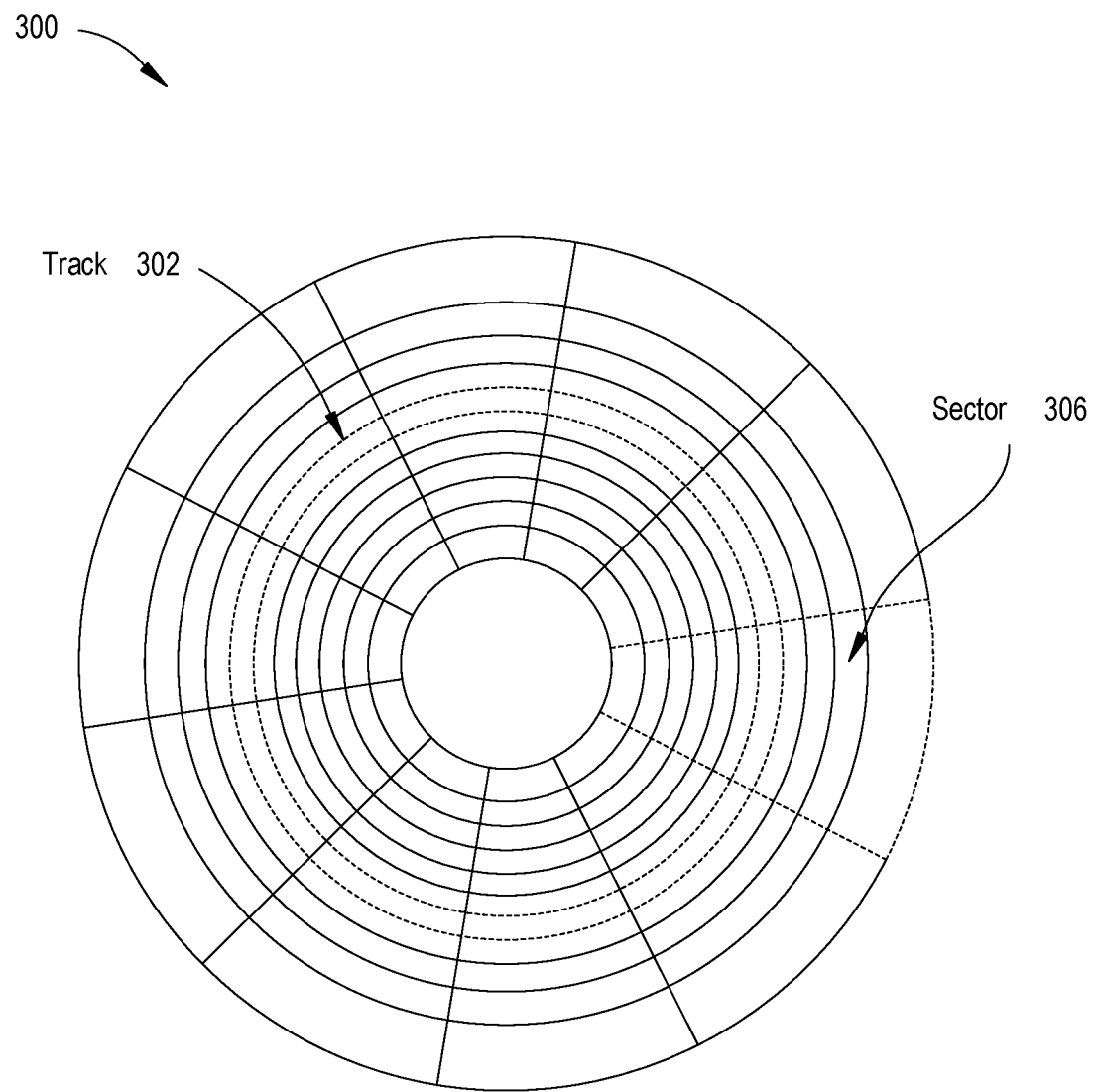
FIG. 3 shows example of a hard drive disk (HDD) with tracks, according to an exemplary embodiment.

FIG. 3 shows example of a hard drive disk (HDD) 300 with tracks 302, according to an exemplary embodiment. The HDD 300 comprises sectors 306. If data goes beyond the length of the track 302, the use of NVM, such as NAND memory to avoid an extra seek is proposed. Using NVM is also applicable when the data spans to multiple tracks, but one of the tracks 302 is significantly smaller than the other track 302. For example, the outermost track 302 will have more storage space than the data track 302 adjacent thereto due to the decreasing circumference of the tracks 302 from the outermost track 302 to the innermost track 302. Furthermore, the innermost track 302 will have significantly less storage space than the outermost track 302. When data spans across multiple tracks, the majority of the data is stored on a single track while the remaining or tail piece of information can be stored in the NVM.

In another embodiment, the track 302 has a track boundary. When having a large piece of information that extends past the track boundary the additional information or tail information needs to be stored. The tail information may be stored in a separate location such as NVM which avoids a track seek of the track 302 that has the bulk of the information.

In one embodiment, the data file is larger than a single track 302, and needs to be stored on an adjacent or separate track. When having a large piece of information that extends past the original track, the additional information can be stored in NVM to avoid a track seek of the bulk information on the track 302.

Figure 4:
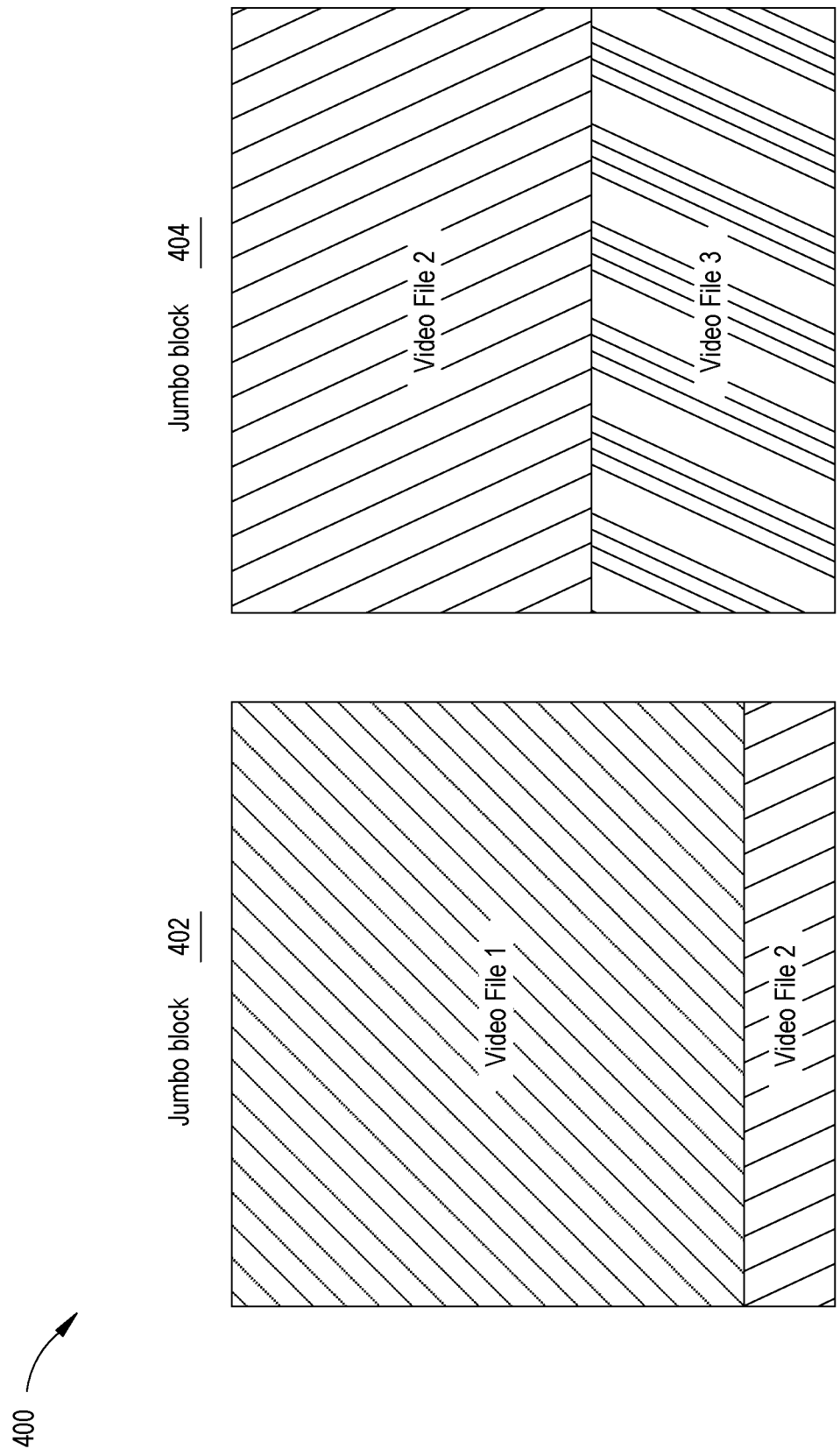
FIG. 4 shows example of multiple JB's containing multiple video files, according to an exemplary embodiment.

FIG. 4 shows example of multiple JBs 400 containing multiple video files, according to an exemplary embodiment. JB 402 holds video file 1 and part of video file 2, while JB 404 holds the remaining portion of video file 2 and video file 3. Both JB 402 and JB 404 have multiple video files. In JB 402 video file 1 is larger than the video file 2. In JB 404 the video file 2 is larger than the video file 3. When the user decides to erase video file 1, GC needs to be done on JB 402. If the user decide to erase video file 2 then GC must be done on both JB 402 and JB 404. The GC on JB 402 will be more expensive to run since the remaining video file 1 is larger than the deleted video file 2.

Having the video files combined on a JB creates problems at the time of GC. If there were only a single video file per JB, then GC would be simpler. For example, if video file 1 was on a single JB, video file 2 was on a separate JB, and video file 3 was on a separate JB, then erasing any of the video files would not result in a GC operation for either any of the other JBs. An issue that can arise is when a single video file does not encompass the entirety of a JB as shown in FIG. 4. Due to sequential writing, the once video file 1 is completely written, video file 2 is then written starting at the location right after the end of video file 1 and hence, video file 1 and video file 2 are in the same JB. Additionally, video file 2, because video file 2 is larger than the remaining space in the JB where video file 1 is located, now is spread out among multiple JBs, with no single portion of video file 2 filling an entire JB.

Figure 5:
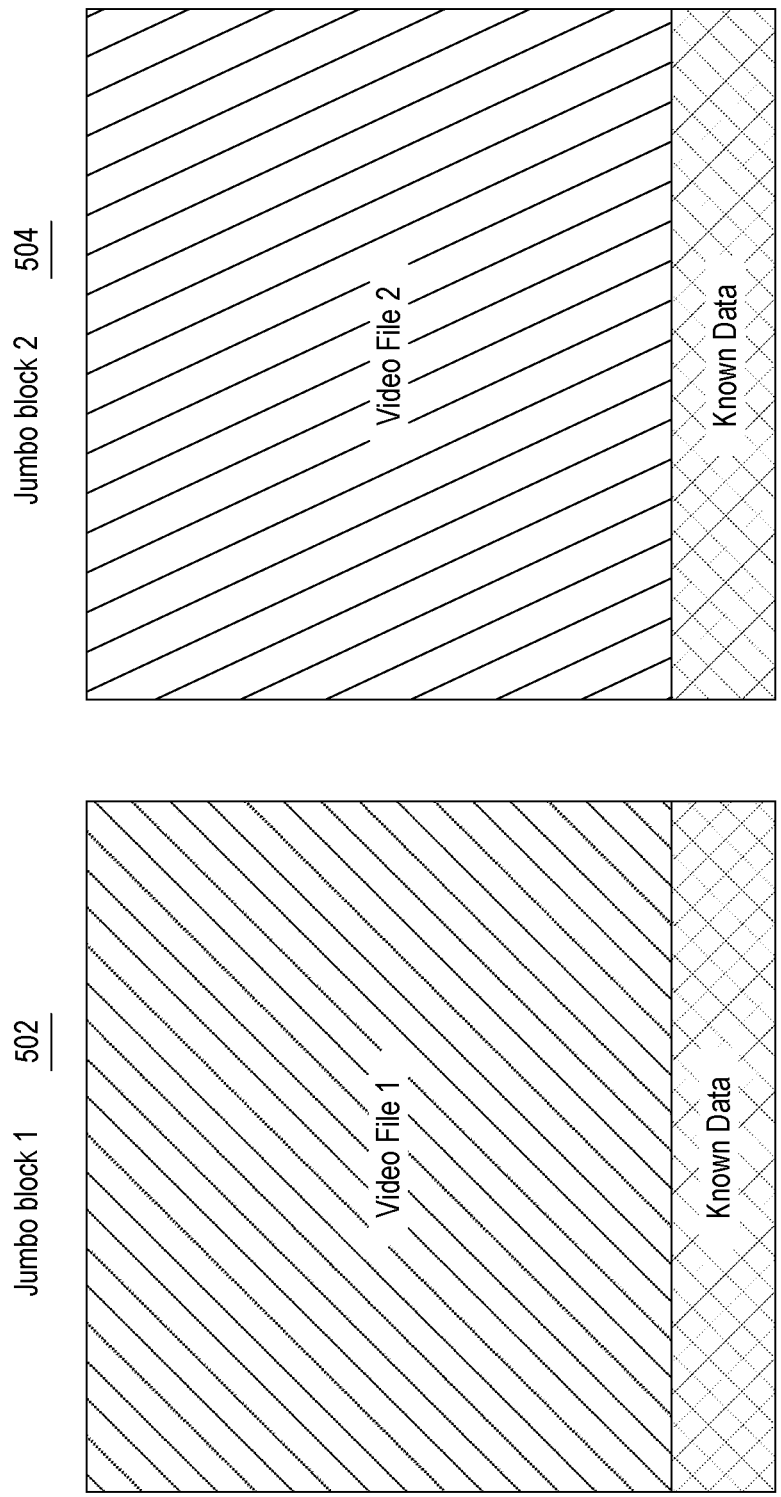
FIG. 5 shows example of multiple JB's containing a single video file, according to an exemplary embodiment.

One solution is to have only one video file per JB. When the video file does not fill the JB completely, rather than writing only a portion of another video file to the JB, other data is written to fill the JB. FIG. 5 shows example of multiple JBs 500 containing a single video file, according to an exemplary embodiment. JB 502 holds video file 1 and known data, while JB 504 holds video file 2 and known data. The known data can be any type data (i.e., junk data, dummy data, meta data . . . etc.) generated by the memory device. Compared to FIG. 4, video file 1 and video file 2 are on different JBs, and each of video file 1 and video file 2 do not encompass the entirety of either JB. If video file 2 is deleted from JB 504 then JB 504 will get assigned to a free block avoiding all GC. JB 502 would not need to undergo a GC operation upon the erasure of video file 2.

Since video file 1 and video file 2 do not fill their respective blocks, both JB 502 and JB 504 fill the remaining JB space with known data. Filling the remaining JB with known data avoids data retention issues. Instead of the firmware (FW) writing to all unused WLs, the FW can choose to update first two WLs of unused WLs with known data. The remaining unused WLs can be then filled using a NVM on-chip scrambler, which will avoid FW overhead in preparing data payload for each different WL. Alternatively, the remaining WLs can remain unwritten.

In another embodiment, if the size of the video file 1 and video file 2 are both known, then know data can be filled in the JB block prior to the video files. For example, the JB 502 and JB 504 may be filed with SLC data for the first few WLs in both JB 502 and JB 504, which will give the user fast access to the stored data. Stated another way, if the size of the video file is known, the video file does not necessarily need to be at the beginning of the JB with the known data at the end of the JB. The known data can be placed at the beginning of the JB and the video file in the remainder of the JB.

Figure 6:
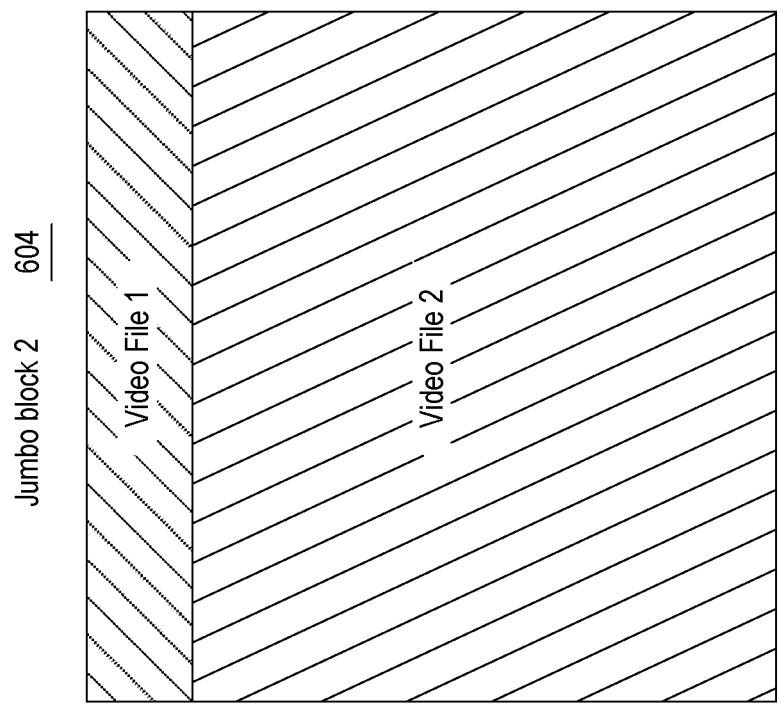
FIG. 6 shows example of video files across multiple JB's, according to an exemplary embodiment.
Figure 6:
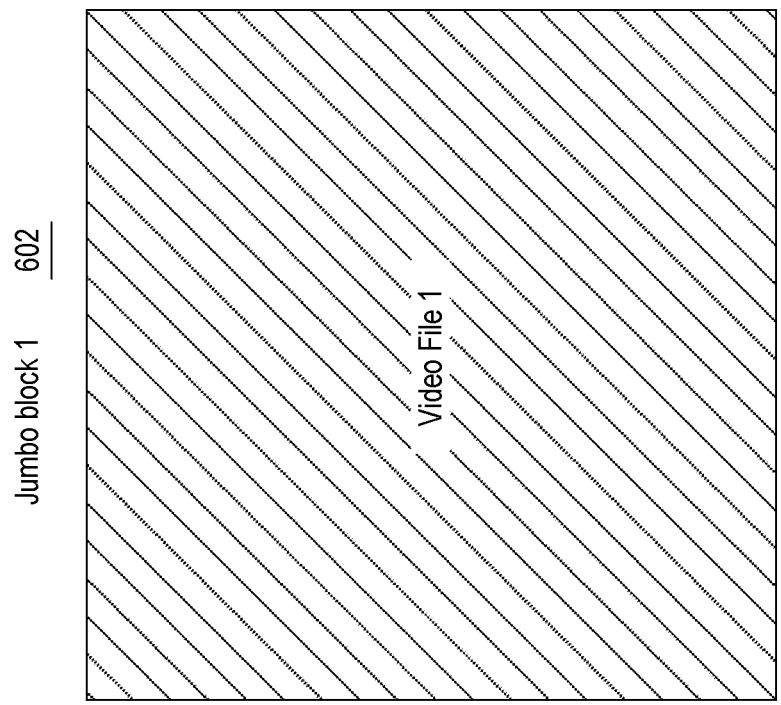

FIG. 6 shows example of video files across multiple JBs 600, according to an exemplary embodiment. JB 602 holds majority of video file 1, while JB 604 holds the remaining portion of video file 1 including the entirety of video file 2. As stated previously if video file 1 is deleted, then GC will be triggered for both JB 602 and JB 604.

When the video files are smaller than the size of a JB, then a single video file in a JB together with known data will fill a JB. When a single video file is larger than a JB, the tail portion of the video file needs to be stored somewhere. Stated another way, if the video file fills one or more JBs entirely but still has a small portion or tail portion that will not completely fill a JB, the tail portion needs to be stored somewhere. As shown in FIG. 6, video file 1 is larger than a single JB, but the tail portion that is written to JB 2 604 is not enough to file JB 2 604. As such, video file 2 is written in JB 2 604, which potentially will lead to a GC issue. Storing the tail portion of video file 1 in a location other than JB 2 604 could be beneficial so that the resulting JBs will have JB 1 602 completely filled with a portion of video file 1, JB 2 604 filled with all of video file 2 and some known data, and the tail portion of video file 1 (i.e., the portion shown in JB 2 604 in FIG. 6) stored elsewhere. The elsewhere location is a tail block.

Figure 7:
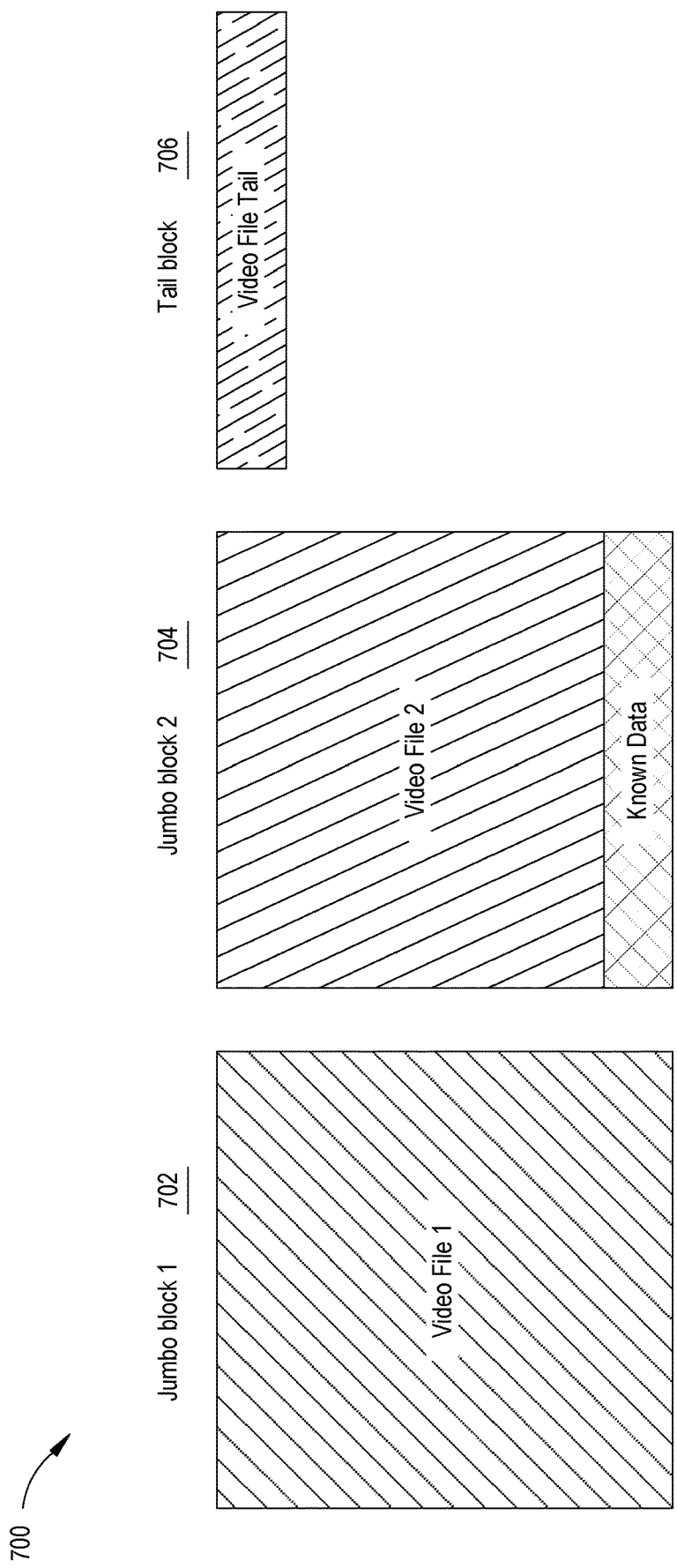
FIG. 7 shows example of JB's containing a single file and a tail block, according to an exemplary embodiment.

FIG. 7 shows example of JBs containing a single file and a tail block, according to an exemplary embodiment. JB 702 contains the majority of video file 1, while JB 704 contains video file 2 and some known data. There is an additional portion of video file 1 that is stored in the tail block (TB) 706. The additional portion of a video file is considered a video file tail. If the user is not able to fit a complete video file in a single JB then the video file tail will be added to the TB 706 designated for only video file tails. The TB 706 is comprised of one or more video file tails from one or more video files. For example if video file 1 and the video file 2 both have video file tails, then the two video file tails will both be stored in the TB 706. Adding all the video file tails to a designated TB 706 insures reduced GC of the JBs where GC is not necessary.

The TB 706 may have a size that is less than the size of a JB. Additionally and/or alternatively, the TB 706 may be a different memory type compared to the JB. For example, the TB 706 may be disposed in HMB while the JB is disposed in the memory device. Furthermore, the TB 706 may be in a distinct memory device from the JB.

It is also to be noted that while FIGS. 4-7 reference JBs and, ultimately a TB, the examples are equally applicable to HDDs where instead of JBs, a data track on a magnetic media are used and the TB can be either in a dedicated track or in a NVM that is separate and distinct from the magnetic media, yet still a part of the HDD.

Figure 8:
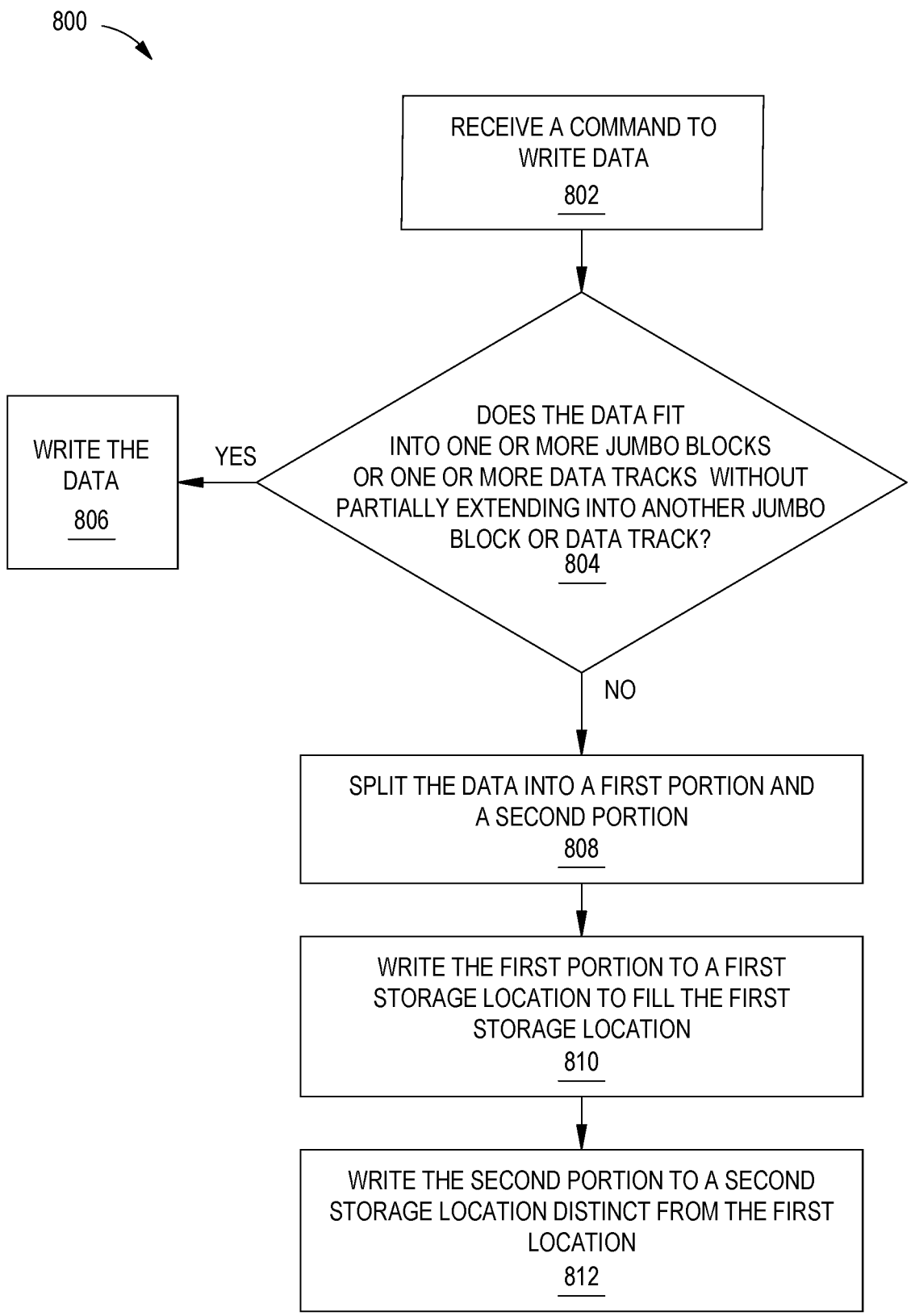
FIG. 8 is a flow chart illustrating a method for a write process, according to certain embodiments.

FIG. 8 is a flow chart illustrating a method 800 for a write process, according to certain embodiments. The method 800 begins at block 802. At block 802, the controller such as the controller 108 of FIG. 1 receives a command to write data. At block 804, the controller determines whether the data fits into one or more JBs or one or more data tracks without partially extending into another JB or data track. If the controller determines that the data fits into one or more JBs or data tracks then method 800 proceeds to block 806. At block 806, the controller writes the data to the JB or data track. If the controller determines that the data does not fit into one or more JBs or data tracks, then the method 800 proceeds to block 808. At block 808, the data is spilt into a first portion and a second portion. At block 810, the controller writes the first portion to a first storage location (i.e., JB or data track) to fill the first storage location. At block 812, the controller writes the second portion to a second storage location (i.e., TB or NVM separate from the data track magnetic media) distinct from the first location.

Figure 9:
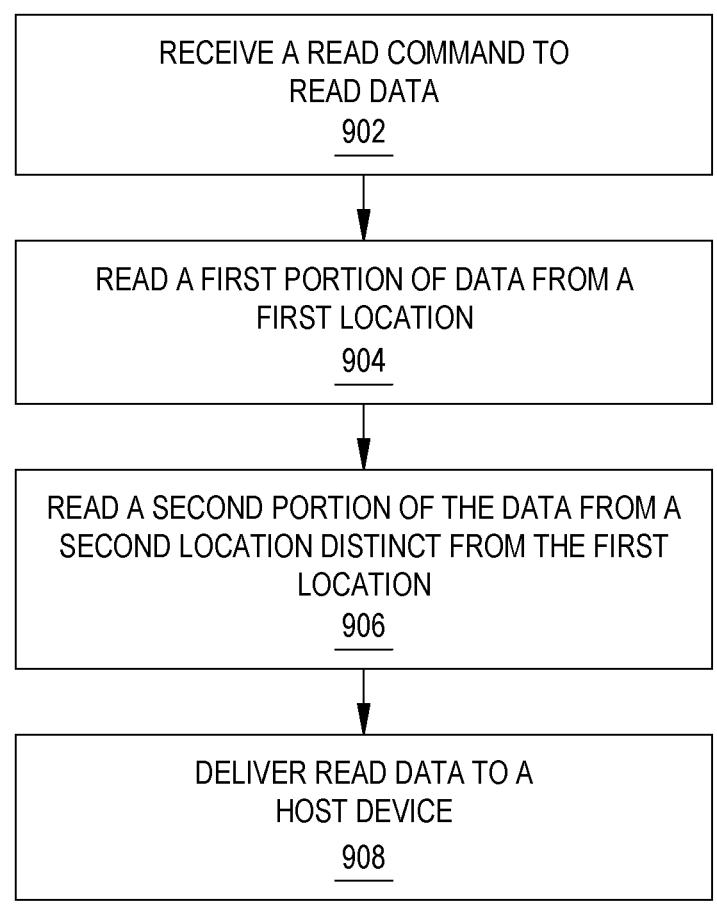
FIG. 9 is a flow chart illustrating a method for a read process, according to certain embodiments.

FIG. 9 is a flow chart illustrating a method 900 for a read process, according to certain embodiments. The method 900 begins at block 902. At block 902, the controller, such as the controller 108 of FIG. 1, receives a read command to read data. At block 904, the controller reads a first portion of data from a first location. At block 906, the controller reads a second portion of the data from a second location distinct from the first location. At block 908, the controller delivers read data to a host device.

What specifically is the first location and the second location creates interesting scenarios. For example, the first location may be the location where the tail portions is located such that the tail portion is read first and the main, larger portion is read second. As such, it is contemplated that the tail portion need not necessarily be the end of the file, but rather, may be the beginning of the file. Also, since the first location and second location are separate, the data may be read from the first location and second location simultaneously. In the case of HDD, seeking the location of the larger portion of the file on the magnetic media may occur while reading the tail portion from NVM. In such a situation, reading the tail portion can hide the slower seeking function to find the data track. Stated another way, in a HDD environment, read latency may be reduced by retrieving the tail portion from NVM while simultaneously seeking the data track for the larger, main portion of the data. In the case of SSD, the first location may be able to be read faster to hide read latencies for the second location. An example could be the first portion being SLC where the tail portion is located and the second portion where the main, larger portion is located is QLC.

It is also contemplated that the first location could be the location where the main, larger portion is located while the second portion could be the location where the tail is located.

The use of TBs for additional data storage avoids the need to use multiple JBs to store a single large piece of data causing increased GC. Adding known data to JBs that are not filed by a single piece also decreases GC of JBs.

In one embodiment, a data storage device comprises: a memory device; and a controller coupled to the memory device, wherein the controller is configured to: receive a first command to write first data to the memory device; determine that the first data will comprise: a first portion that will span an entirety of one or more first jumbo blocks of the memory device; and a second portion that will span less than an entirety of a jumbo block of the memory device; write the first portion to the one or more first jumbo blocks; allocate a first tail block storage location from a tail block pool of the memory device; and write the second portion to the tail block storage location. The controller is further configured to: receive a second write command to write second data to the memory device; determine that the second data will comprise: a third portion that will span an entirety of one or more second jumbo blocks of the memory device; and a fourth portion that will span less than an entirety of a jumbo block of the memory device; write the third portion to the one or more second jumbo blocks; allocate a second tail block storage location from the tail block pool of the memory device; and write the fourth portion to the second tail block storage location. The second tail block storage location and the first tail block storage location comprise a same storage location. The controller is configured to: receive a command to delete the first data; erase the one or more first jumbo blocks; and release the one or more first jumbo blocks to a free jumbo block pool. The controller is configured to perform the releasing without performing a garbage collection on the one or more first jumbo blocks. The first tail block storage location has a storage size that is less than a storage size of the jumbo block. The one or more first jumbo blocks are disposed in NAND and the first tail block storage location is disposed in DRAM or SRAM. The data is video data.

In another embodiment, a data storage device comprises: a first memory device; a second memory device; and a controller coupled to the first memory device and the second memory device, wherein the controller is configured to: receive a command to write first data to the first memory device; determine that the first data will comprise: a first portion that will span an entirety of one or more first data tracks of the first memory device; and a second portion that will span less than an entirety of a data track of the first memory device; write the first portion to the one or more first data tracks of the first memory device; and write the second portion to the second memory device. The first memory device is a hard disk drive (HDD) disk and the second memory device is a non-volatile memory device that is distinct from the HDD disk. The second memory device is NAND. The second portion is an ending portion of the data. The second portion is a beginning portion of the data. The controller is further configured to: receive a read command to read the data; read the second portion; and read the first portion, wherein the controller is configured to seek a location of the first portion while reading the second portion. The first memory device has a slower access time than the second memory device. The controller is further configured to: receive a second write command to write second data to the first memory device; determine that the second data will comprise: a third portion that will span an entirety of one or more second data tracks of the first memory device; and a fourth portion that will span less than an entirety of a data track of the first memory device; write the third portion to the one or more second data tracks; and write the fourth portion to the second memory device. The first data and the second data have a same size, and wherein the second portion and the fourth portion have different sizes.

In another embodiment, a data storage device comprises: means to store data; and a controller coupled to the means to store data, wherein the controller is configured to: receive a command to write data to the means to store data; determine that the data will comprise: a first portion that will span an entirety of one or more jumbo blocks of the means to store memory; and a second portion that will span less than an entirety of a jumbo block of the means to store memory; write the second portion to single level cell (SLC) memory of the one or more jumbo blocks; and write the first portion to multi-level cell (MLC) memory of the one or more jumbo blocks. The SLC memory and the MLC memory are disposed within a same jumbo block. The data has a size of one or more allocation unit (AUs), wherein the one or more AUs are unaligned with the one or more jumbo blocks prior to writing, and wherein after writing the first portion and the second portion are aligned to the one or more jumbo blocks.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
  receive commands to write data to the memory device;
  determine whether data of each received command comprises:
    a first portion that will fill an entirety of one or more blocks of the memory device; and
    a second portion that will fill less than an entirety of a block of the memory device; and
  split data of one or more commands of the received commands based on the determining, wherein the splitting comprises:
    writing the first portion of a first command of the one or more commands to an entirety of first one or more blocks;
    writing the first portion of a second command of the one or more commands to an entirety of second one or more blocks;
    allocating a tail block storage location from a tail block pool of the memory device, wherein the allocating further comprises designating the tail block storage location to store only second portions of the one or more commands; and
    writing the second portions of the first command and the second command to the tail block storage location.

2. The data storage device of claim 1, wherein the controller is configured to:
receive a command to delete data of the first command;
erase the entirety of the first one or more blocks; and
release the entirety of the first one or more blocks to a free block pool.

3. The data storage device of claim 2, wherein the controller is configured to perform the releasing without performing a garbage collection on the entirety of the first one or more blocks.

4. The data storage device of claim 1, wherein the tail block storage location has a storage size that is less than a storage size of the block.

5. The data storage device of claim 1, wherein the tail block storage location is disposed in DRAM or SRAM.

6. The data storage device of claim 1, wherein the data is video data.

7. The data storage device of claim 1, wherein the tail block storage location is separate and distinct from the first and second one or more blocks.

8. The data storage device of claim 2, wherein the controller is configured to perform the releasing without performing a garbage collection on the tail block storage location.

9. A data storage device, comprising:
a first memory device;
a second memory device; and
a controller coupled to the first memory device and the second memory device, wherein the controller is configured to:
  receive commands to write data to the first memory device;
  determine whether data of each received command comprises:
    a first portion that will fill an entirety of one or more data tracks of the first memory device; and
    a second portion that will fill less than an entirety of a data track of the first memory device; and
  split data of one or more commands of the received commands based on the determining, wherein the splitting comprises:
    writing the first portion of a first command of the one or more commands to an entirety of first one or more data tracks of the first memory device;
    writing the first portion of a second command of the one or more commands to an entirety of second one or more data tracks of the first memory device;
    allocating a tail block storage location from a tail block pool of the second memory device, wherein the allocating further comprises designating the tail block storage location to store only second portions of the one or more commands; and writing the second portions of the first command and the second command to the second memory device.

10. The data storage device of claim 9, wherein the first memory device is a hard disk drive (HDD) disk and the second memory device is a non-volatile memory device that is distinct from the HDD disk.

11. The data storage device of claim 10, wherein the second memory device is NAND.

12. The data storage device of claim 9, wherein the second portion is an ending portion of the data of a command, wherein the ending portion is a portion of the data of the command that is read after the first portion of the data of a command.

13. The data storage device of claim 9, wherein the second portion is a beginning portion of the data of a command, wherein the beginning portion is a portion of the data of the command that is read before the first portion of the data of a command.

14. The data storage device of claim 13, wherein the controller is further configured to:

receive a read command to read data of at least one command of the one or more commands;

read the second portion of the at least one command; and read the first portion of the at least one command, wherein the controller is configured to seek a location of the first portion of the at least one command while reading the second portion of the at least one command.

15. The data storage device of claim 9, wherein the first memory device has a slower access time than the second memory device.

16. The data storage device of claim 9, wherein data of the first command and the data of the second command have a same size, and wherein the second portion of the first command and the second portion of the second command have different sizes.

17. A data storage device, comprising:

means to store data; and a controller coupled to the means to store data, wherein the controller is configured to:

receive commands to write data to the means to store data;

determine whether data of each received command comprises:

a first portion that will fill an entirety of one or more blocks of the means to store memory; and a second portion that will fill less than an entirety of a block of the means to store memory; and split data of one or more commands of the received commands based on the determining, wherein the splitting comprises:

writing the second portions of a first command and a second command of the one or more commands to single level cell (SLC) memory of the one or more blocks;

writing the first portion of the first command to multi-level cell (MLC) memory of an entirety of first one or more blocks;

allocating a tail block storage location from a tail block pool of the means to store memory, wherein the allocating further comprises designating the tail block storage location to store only second portions of the one or more commands; and writing the first portion of the second command to multi-level cell (MLC) memory of an entirety of second one or more blocks.

18. The data storage device of claim 17, wherein data of the first command has a size of one or more allocation unit (AUs), wherein the one or more AUs are unaligned with the first one or more blocks prior to writing, and wherein after writing the first command, the first portion and the second portion are aligned to the one or more blocks.

19. The data storage device of claim 17, wherein a read latency of the first portion of the first command is greater than a read latency of the second portion of the first command.

* * * * *